US009253218B2

(12) United States Patent
Birch et al.

(10) Patent No.: US 9,253,218 B2
(45) Date of Patent: Feb. 2, 2016

(54) INTERFACE FOR CONNECTING A NETWORK ELEMENT TO A SESSION INITIATION PROTOCOL APPLICATION SERVER

(75) Inventors: Oliver Birch, Annapolis, MD (US); Bouna Sall, Bowie, MD (US); Can Paul Boyacigiller, Annapolis, MD (US); Sreenivasa R. Pamidala, Crofton, MD (US)

(73) Assignee: International Business Machines Corporation, Armonk, NY (US)

(*) Notice: Subject to any disclaimer, the term of this patent is extended or adjusted under 35 U.S.C. 154(b) by 740 days.

(21) Appl. No.: 12/428,693

(22) Filed: Apr. 23, 2009

(65) Prior Publication Data

US 2010/0274914 A1  Oct. 28, 2010

(51) Int. Cl.
*G06F 15/16* (2006.01)
*H04L 29/06* (2006.01)
*H04L 29/08* (2006.01)

(52) U.S. Cl.
CPC .......... *H04L 65/104* (2013.01); *H04L 65/1006* (2013.01); *H04L 67/02* (2013.01); *H04L 69/08* (2013.01)

(58) Field of Classification Search
CPC ..... H04L 67/02; H04L 67/2823; H04L 69/18; H04L 69/08; H04L 65/1006; H04L 29/06068; H04L 67/40
USPC ...................................... 709/230; 370/395.52
See application file for complete search history.

(56) References Cited

U.S. PATENT DOCUMENTS

| | | | | |
|---|---|---|---|---|
| 5,392,402 A * | 2/1995 | Robrock, II | .................... | 709/227 |
| 5,509,010 A * | 4/1996 | La Porta et al. | ............... | 370/397 |
| 5,680,446 A * | 10/1997 | Fleischer et al. | .......... | 379/114.28 |
| 5,805,675 A * | 9/1998 | Chanda | ....................... | 379/93.14 |
| 5,825,857 A * | 10/1998 | Reto et al. | ................ | 379/114.15 |
| 5,974,133 A * | 10/1999 | Fleischer et al. | .............. | 379/230 |
| 6,111,881 A * | 8/2000 | Soncodi | ................... | 370/395.32 |
| 6,243,383 B1 * | 6/2001 | Li et al. | ...................... | 370/395.6 |
| 7,187,671 B2 * | 3/2007 | Moyano et al. | ............... | 370/353 |
| 7,224,686 B1 * | 5/2007 | Doskow et al. | ............... | 370/352 |
| 7,272,662 B2 * | 9/2007 | Chesnais et al. | ............. | 709/246 |
| 7,509,431 B2 * | 3/2009 | Singhal et al. | ................ | 709/230 |
| 7,617,328 B2 * | 11/2009 | Lewis et al. | ................... | 709/246 |

(Continued)

OTHER PUBLICATIONS

Miller; Carrying TCAP in SIP messages; draft-miller-sip-tcap-00; Jan. 8, 2003.*

*Primary Examiner* — Melvin H Pollack
*Assistant Examiner* — Lin Liu
(74) *Attorney, Agent, or Firm* — Robert J. Sacco; Carl E. Thorstad-Forsyth; Fox Rothschild LLP

(57) ABSTRACT

Systems (100) and methods (500) for connecting network resources of a first network (116) to network resources of a second network (118). The second network is different from the first network. The methods involve receiving a first message (302, 402) from a first network resource (106) of the first network. The first message has a first protocol format. In response to the first message, a second message (308, 408) having a web service request format is dynamically generated. The second message is communicated to a third network resource (112) of the second network for conversion into a third message (314). The third message has a second protocol format different from the first protocol format. The first network can be an SIP network. The second network can be an SS7 network.

20 Claims, 6 Drawing Sheets

(56) References Cited

U.S. PATENT DOCUMENTS

| | | | |
|---|---|---|---|
| 7,649,908 B2* | 1/2010 | Schwalb | 370/467 |
| 7,685,304 B2* | 3/2010 | Kothari et al. | 709/230 |
| 7,701,925 B1* | 4/2010 | Mason et al. | 370/352 |
| 7,817,665 B2* | 10/2010 | Khan | 370/467 |
| 7,975,059 B2* | 7/2011 | Wang et al. | 709/230 |
| 7,983,245 B2* | 7/2011 | Eichler et al. | 370/352 |
| 8,019,818 B2* | 9/2011 | Lorch et al. | 709/205 |
| 8,020,201 B2* | 9/2011 | Adusumilli et al. | 726/12 |
| 8,082,304 B2* | 12/2011 | Ho et al. | 709/206 |
| 8,542,673 B2* | 9/2013 | Caughey | 370/352 |
| 8,694,585 B2* | 4/2014 | Turner et al. | 709/204 |
| 8,743,709 B1* | 6/2014 | Stegall | 370/252 |
| 2004/0062375 A1* | 4/2004 | Wang et al. | 379/219 |
| 2004/0141596 A1* | 7/2004 | Crockett et al. | 379/88.17 |
| 2006/0056419 A1* | 3/2006 | Eichler et al. | 370/395.52 |
| 2006/0209791 A1* | 9/2006 | Khadri et al. | 370/352 |
| 2006/0274730 A1* | 12/2006 | Medlock et al. | 370/352 |
| 2007/0008955 A1* | 1/2007 | Delaney et al. | 370/352 |
| 2007/0116223 A1* | 5/2007 | Burke et al. | 379/201.12 |
| 2007/0242696 A1* | 10/2007 | Signaoff et al. | 370/469 |
| 2007/0263609 A1* | 11/2007 | Mitchell | 370/356 |

* cited by examiner

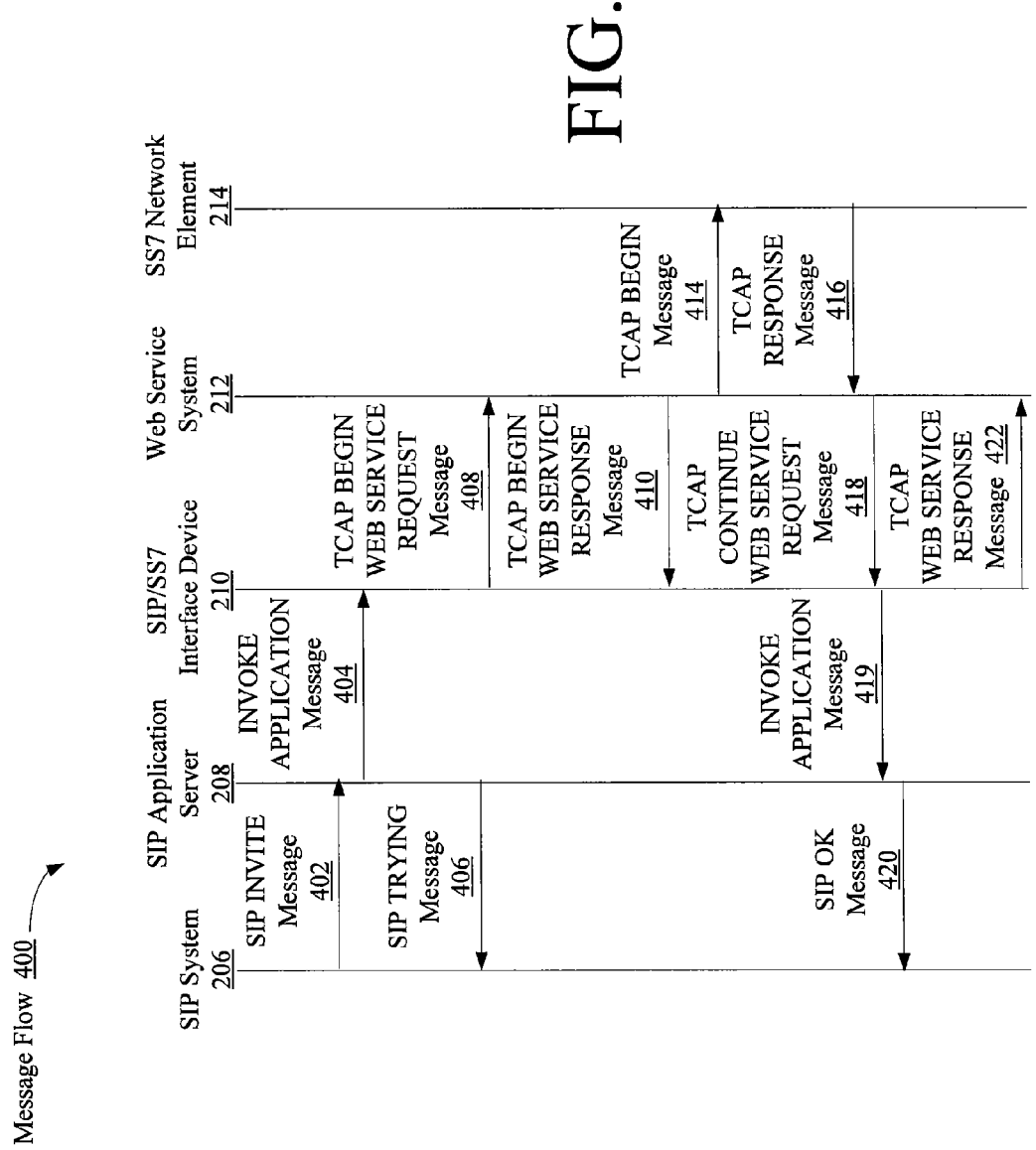

INTERFACE FOR CONNECTING A NETWORK ELEMENT TO A SESSION INITIATION PROTOCOL APPLICATION SERVER

BACKGROUND OF THE INVENTION

1. Statement of the Technical Field

The present invention relates to systems and methods for connecting network resources of a first network to network resources of a second network that is different from the first network. More particularly, the present invention relates to systems and methods for connecting a network resource with a Transfer Capabilities Application Part (TCAP) interface to a Session Initiation Protocol (SIP) based network resource.

2. Description of the Related Art

Recently, there has been a significant effort to develop a standard architecture and set of interfaces for components in a telecommunication service provider's next generation network. Various solutions exist for interfacing components in the telecommunication service provider's next generation network. A first solution generally involves connecting an SIP application server to a legacy network element comprising a Signaling System Number Seven (SS7) ISDN User Part (ISUP) interface. ISUP messages are passed from the legacy network element to the SIP application server by appending them to the relevant SIP messages. This solution works well for ISUP messages because the ISUP and SIP messages are both session related messages. Also, ISUP messages cleanly map to SIP messages. However, this solution provides undesirable results for passing non-session related messages to the SIP application server.

A second solution generally involves extracting key parameters of a TCAP message. Thereafter, the extracted key parameters are passed to the SIP application server in an SIP message header or an SIP Uniform Resource Identifier (URI). Despite the advantages of this solution, it suffers from certain drawbacks. For example, this solution is not programmable because it relies on a predetermined mapping for each TCAP application.

A third solution generally involves setting up an SIP session specifically for passing non-session related TCAP messages to the SIP application server. Despite the advantages of this solution, it suffers from certain drawbacks. For example, this solution requires at least six (6) SIP messages to set up and end each session. The six (6) messages include an INVITE message, a TRYING message, a first OK message, an ACK message, and a BYE message, and a second OK message. Each of the listed messages are well known to those having ordinary skill in the art. These six (6) messages are an overhead on top of the additional messages and responses required to actually pass the required information between two (2) systems. As a result of the six (6) message requirement, the third solution is an inefficient solution. The inefficiency of the third solution may prohibit its use in certain application due to the latency of establishing the session.

SUMMARY OF THE INVENTION

This Summary is provided to comply with 37 C.F.R. §1.73, requiring a summary of the invention briefly indicating the nature and substance of the invention. It is submitted with the understanding that it will not be used to interpret or limit the scope or meaning of the claims.

Embodiments of the present invention relate to systems and methods for connecting network resources of a first network to network resources of a second network. The second network is different from the first network. The method embodiments generally involve receiving a first message from a network resource of the first network. The first message has a first protocol format. In response to the first message, a second message having a web service request format is dynamically generated. The second message is communicated to a network resource of the second network for conversion into a third message. The third message has a second protocol format different from the first protocol format. The first network can be an SIP network. The second network can be an SS7 network.

BRIEF DESCRIPTION OF THE DRAWINGS

Embodiments will be described with reference to the following drawing figures, in which like numerals represent like items throughout the figures, and in which:

FIG. 4 is a schematic illustration of message flows in an embodiment of a process for connecting an SS7 network resource shown in FIG. 2 to an SIP network resource shown in FIG. 2.

DETAILED DESCRIPTION OF THE PREFERRED EMBODIMENTS

The present invention is described with reference to the attached figures, wherein like reference numbers are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operation are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

Embodiments of the present invention generally involve implementing systems and methods for connecting a network resource of a first network to a network resource of a second different network. According to embodiments of the present invention, the methods are implemented in a Session Initiation Protocol (SIP)/Signaling System Number Seven (SS7) based system. In such a scenario, the method involves connecting an SS7 network resource with a Transfer Capabilities Application Part (TCAP) interface to an SIP network resource. The phrase "Signaling System Number Seven (SS7)", as used herein, refers to a set of protocols that describe a means of communication between telephone switches in public telephone networks. Typically, SS7 communication protocols are used to provide signaling and control for various network services and capabilities. For example, SS7 communication protocols can be used to set up telephone calls, tear down telephone calls, translate numbers, enable prepaid billing, and enable short message services. The phrase "Transfer Capabilities Application Part (TCAP)", as used herein, refers to a protocol for SS7 networks. The primary purpose of TCAP is to control non-circuit related information switched between two or more signaling nodes. The phrase "Session Initiation Protocol (SIP)", as used herein, refer to a standard protocol for initiating an interactive user session that involves multimedia elements. The multimedia elements can include, but are not limited to, video, voice, chat-gaming and virtual reality. Method embodiments of the present invention will be described below in relation to FIG. 1. System embodiments of the present invention will be described below in relation to FIGS. 2-5B.

Method for Connecting Network Resources of Different Networks

Figure 1:
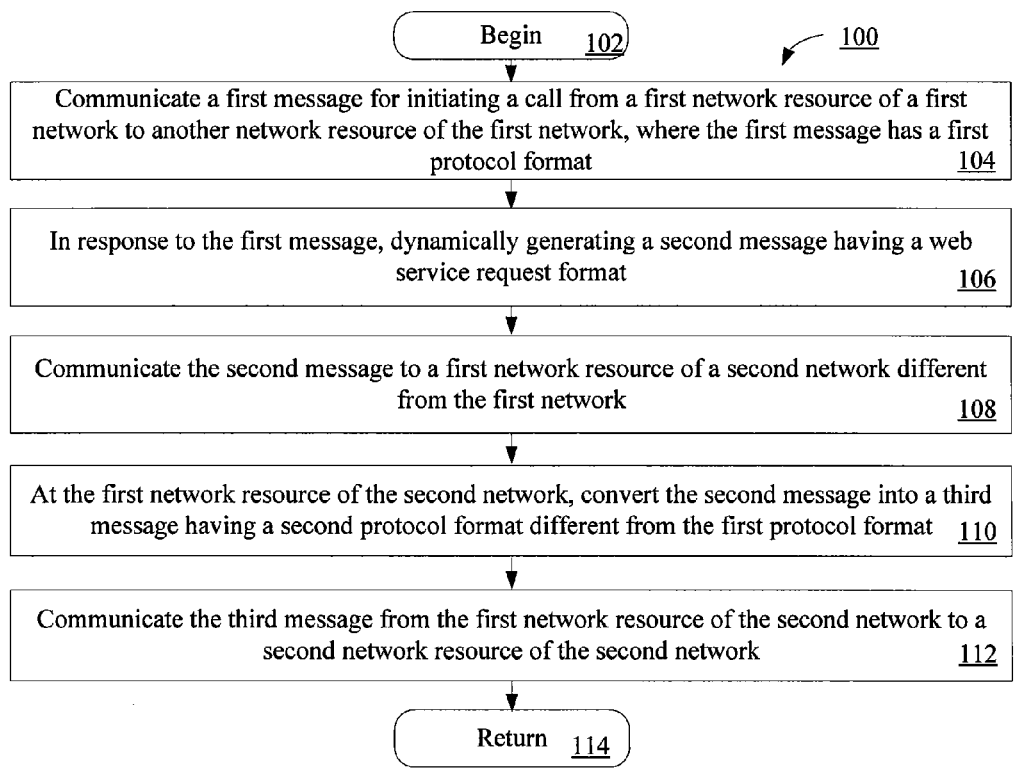
FIG. 1 is a flow diagram of a method for connecting network resources of different networks that is useful for understanding the present invention.

Referring now to FIG. 1, there is provided a flow diagram of a method 100 for connecting network resources of different networks that is useful for understanding the present invention. The method 100 generally involves using a web service invocation for messages sent to or received from a network resource of a first network, where the messages have a first protocol format different from a protocol format of messages sent to or from a network resource of a second different network. The phrase "web service", as used herein, refers to a software system designed to support interoperable machine-to-machine interaction over a network. The machine-to-machine interaction is facilitated by a Web Services Description Language (WSDL). The phrase "Web Services Description Language (WSDL)", as used herein, refers to an XML-based language that provides a model for describing web services. The method 100 provides a solution for interfacing components in a telecommunication service provider's next generation network that is efficient and has low latency.

Referring now to FIG. 1, the method 100 begins with step 102 and continues with step 104. In step 104, a first message for initiating a call is communicated from a first network resource of a first network to a second network resource of the first network. The first network can include, but is not limited to, an SIP based network such as an Internet Protocol Multimedia Subsystem based network. The first network resource can include, but is not limited to, a gateway, a platform or a routing node. The second network resource can include, but is not limited to, an application server. The first network format can include, but is not limited to, a session initiation protocol format.

Upon completing step 104, the method 100 continues with step 106. In step 106, a second message having a web service request format is dynamically generated. The second message generation can be facilitated by a network interface application. The network interface application can be installed on the second resource of the first network or a device communicatively coupled to the second resource. The network interface application can be operative to generate the second message in an Extensible Markup Language format of a web service request. The WSDL for the web service request can include at least one parameter for a message having a second protocol format different from the first protocol format. For example, the WSDL for the web service request can include at least one parameter for a message having an SS7 TCAP protocol format. Embodiments of the present invention are not limited in this regard.

Subsequent to completing step 106, the method 100 continues with step 108. In step 108, the second message is communicated to a first network resource of a second network. The second network is different from the first network. The second network can include, but is not limited to, an SS7 based network. The network resource of the second network can include, but is not limited to, a web service system.

Thereafter, step 110 is performed where the second message is converted into a third message having a second protocol format different from the first protocol format. This message conversion can occur at the first network resource of the second network. The second protocol format can include, but is not limited to, an SS7 TCAP protocol format. In step 112, the third message is communicated from the first network resource of the second network to a second network resource of the second network. The second network resource of the second network can include, but is not limited to, a switch, a database server or a routing node. Subsequently, step 114 is performed where the method 100 returns to step 104 or subsequent processing is resumed.

Communication System Implementation of Method 100

System embodiments of the present invention will not be described in relation to FIGS. 2-5B. The system embodiments implement method 100 described above in relation to FIG. 1. Accordingly, the system embodiments are configured to enable interactions between network resources of a first network and network resources of a second different network.

Figure 2:
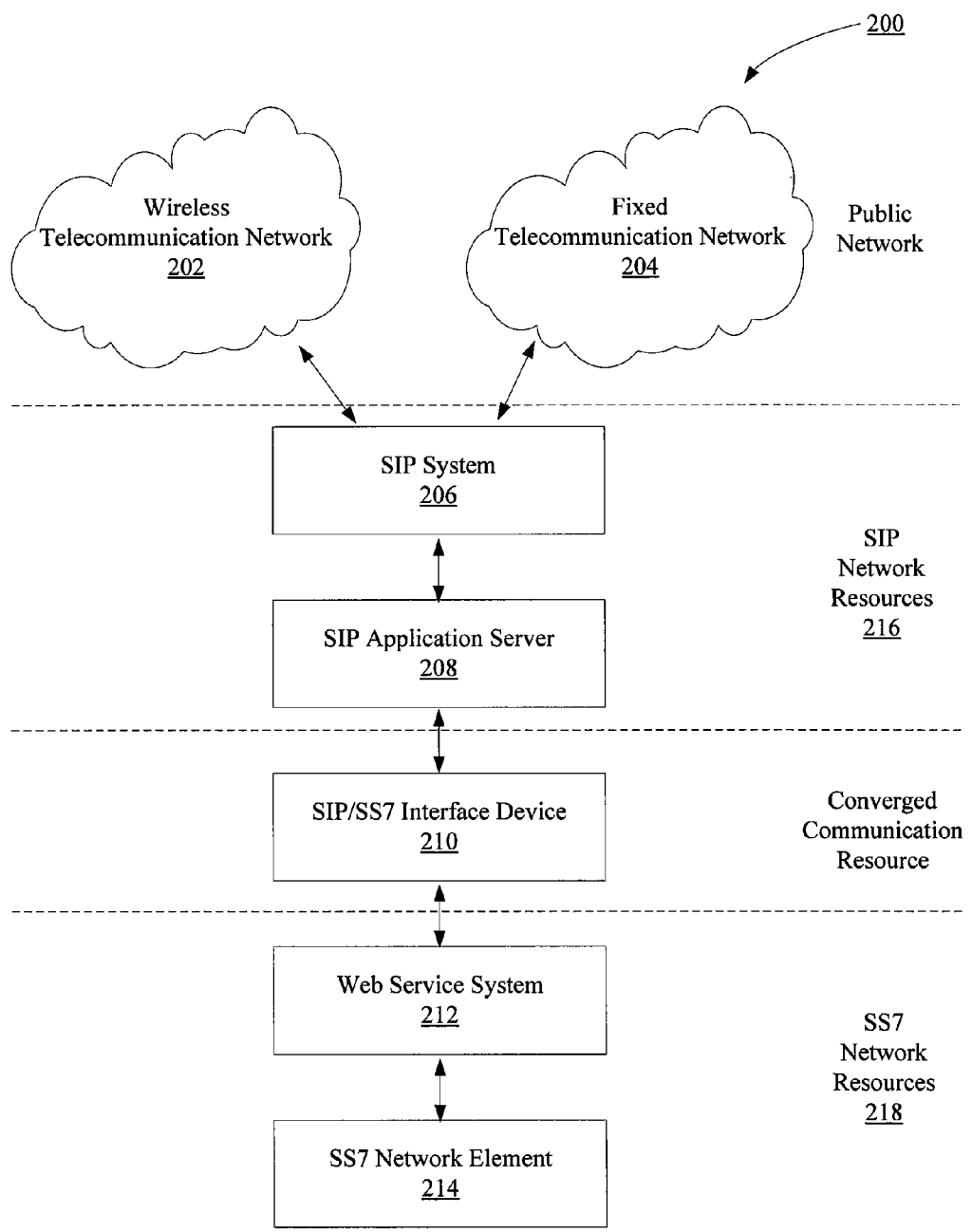
FIG. 2 is a block diagram of an exemplary system that is useful for understanding the present invention.

Referring now to FIG. 2, there is provided a block diagram of an exemplary system 200 that is useful for understanding the present invention. As shown in FIG. 2, the system 200 is comprised of a wireless telecommunication network 202, a fixed telecommunication network 204, an SIP system 206, an SIP application server 208, an SIP/SS7 interface device 210, a web service system 212 and an SS7 network element 214. It should be understood that a converged SIP/SS7 application (not shown in FIG. 2) is installed on the SIP/SS7 interface device 210. However, embodiments of the present invention are not limited in this regard. For example, the converged SIP/SS7 application (not shown in FIG. 2) can alternatively be installed on the SIP application server 208 or the web service system 212. In such a scenario, system 200 is absent of the SIP/SS7 interface device 210.

Referring again to FIG. 2, each of the telecommunication networks 202, 204 generally comprises communication links and nodes arranged so that communications may be passed from one part of the network to another over the communication links and through the various nodes. Each of the telecommunication networks 202, 204 can include, but is not limited to, a pure SIP network and an Internet Protocol (IP) Multimedia Subsystem (IMS) based network.

The IMS based networks generally deliver IP multimedia services to wireless and/or wire line terminals (such as mobile phones, personal digital assistants (PDAs) and computers). The wireless network 202 terminals (not shown) can include, but are not limited to, Wideband Code Division Multiple Access (W-CDMA) enabled terminals, Code Division Multiple Access (CDMA) 2000 enabled terminals, Global System for Mobile (GSM) communications enabled terminals, General Packet Radio Service (GPRS) enabled terminals, Wireless Local Area Network (WLAN) enabled terminals, and Worldwide Inter-operability for Microwave Access (WiMAX) enabled terminals. The fixed network 204 terminals can include, but are not limited to, Digital Subscriber Line (DSL) enabled terminals, Ethernet enabled terminals, and cable modem devices. The IMS based networks use Internet Engineering Task Force (IETF) protocols for communicating data across the IMS based network. Such IEFT protocols include, but are not limited to, session initiation protocols.

As shown in FIG. 2, the networks 202, 204 are communicatively coupled to the SIP system 206. The SIP system 206 is generally configured to accept phone call requests from terminals of the networks 202, 204. Accordingly, the SIP system 206 can include, but is not limited to, a media gateway, an SIP platform, an SIP gateway or any other device configured to accept phone call requests from terminals of the networks 202, 204. The SIP system 206 is communicatively coupled to the SIP application server 208. The SIP application server 208 is generally configured to screen, route and transfer calls. The SIP application server 208 is communicatively coupled to the SIP/SS7 interface device 210.

The SIP/SS7 interface device 210 generally provides an interface between the SIP network resources 216 and SS7 network resources 218. More particularly, the SIP/SS7 interface device 210 is configured to use web services for enabling the interaction between the SIP network resources 216 and SS7 network resources 218. The SIP/SS7 interface device 210 is also configured to manage and process different types of messages (e.g., SIP based messages and TCAP based messages). The SIP/SS7 interface device 210 is further configured to determine a sequence of events to be performed by the system 200 based on the type of message received thereat and/or information contained in the message received thereat. The SIP/SS7 interface device 210 will be described in more detail below in relation to FIG. 3. The SIP/SS7 interface device 210 is communicatively coupled to the web service system 212.

The web service system 212 is generally configured to convert SS7 TCAP messages to web service request messages, and vise versa. As noted above, TCAP is a protocol in the SS7 protocol suite that supports non-circuit related information exchange between signaling points using a Signaling Connection Control Part (SCCP) connectionless service. TCAP also supports remote control, i.e., the ability to invoke features in another remote network switch. TCAP messages are contained within the SCCP portion of a Message Signaling Unit (MSU). A TCAP message is comprised of a transaction portion and a component portion.

The TCAP transaction portion includes the TCAP Primitive with the following primitive types: "Unidirectional" for transferring component(s) in one direction only; "Begin" for initiating a TCAP transaction; "Continue" for continuing a TCAP transaction; "End" for terminating a transaction normally; and "Abort" for terminating a transaction due to an abnormal situation. The TCAP transaction portion also includes an originating transaction identifier. The TCAP transaction portion further includes responding transaction identifier fields which associate a TCAP transaction with a specific application at originating and destination signaling points, respectively.

The TCAP component portion can include an "Invoke" for invoking an operation. The TCAP component portion can also include a "Return Result" for returning a result of an invoked operation, a "Return Error" for reporting an unsuccessful completion of an invoked operation, and/or a "Reject" indicating that an incorrect package type or component was received.

Referring again to FIG. 1, the web service system 212 is communicatively coupled to the SS7 network element 214 and is configured to process SS7 TCAP messages received therefrom. The SS7 network element 214 is also generally configured to provide signaling and control for various SS7 based network services. The SS7 based network services can include, but are not limited to, basic call setup services, management services, tear down services, personal communication services, wireless roaming services, mobile subscriber authentication services, local number portability services, toll-free services, toll wire line services, call forwarding services, calling party name/number display services, three-way calling services, and secure telecommunication services. The SS7 network element 114 can include, but is not limited to, a switch, a database server, a routing node or any other SS7 network based element.

Figure 3:
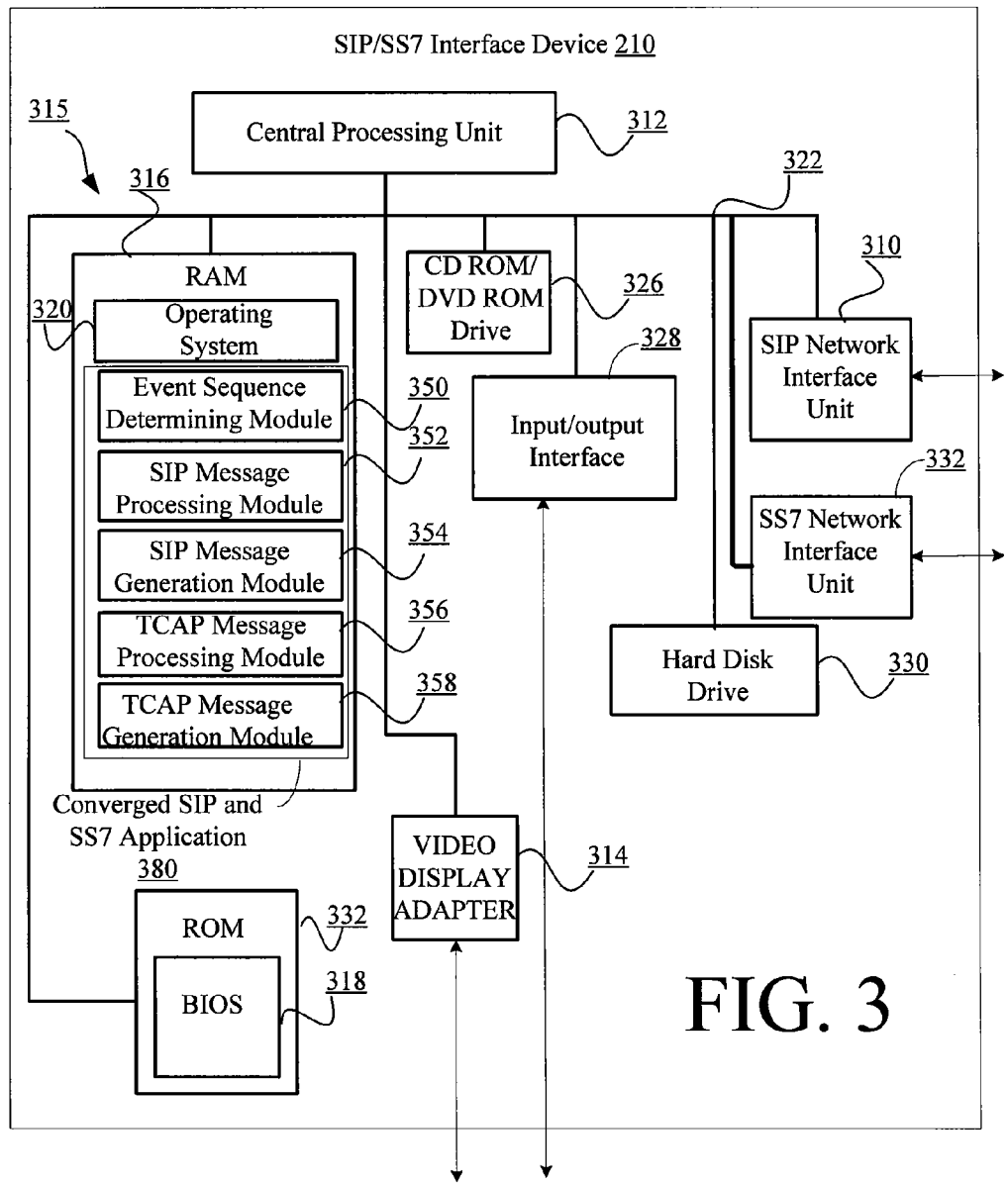
FIG. 3 is a block diagram of an exemplary embodiment of the SIP/SS7 interface device shown in FIG. 2.

Referring now to FIG. 3, there is provided a block diagram of an exemplary embodiment of the SIP/SS7 interface device 210 that is useful for understanding the present invention. As described above, the SIP/SS7 interface device 210 is generally configured to perform one or more tasks for providing an interface between SIP network resources 216 and SS7 network resources 218. In some embodiments of the present invention, the SIP/SS7 interface device 210 can include more or less components than those shown in FIG. 3. The components described below, however, are sufficient to disclose an illustrative embodiment for practicing the present invention.

As shown in FIG. 3, the SIP/SS7 interface device 210 includes a processing unit 312, a video display adapter 314, and a mass memory 315. The components 312, 314, 315 are communicatively coupled to each other via bus 322. Mass memory 315 generally includes a RAM 316, a ROM 332, and one or more permanent mass storage devices. The mass storage devices can include, but are not limited to, a hard disk drive 330, a tape drive (not shown), an optical drive (not shown), and/or a floppy disk drive (not shown). The mass memory 315 stores an operating system 320 for controlling the operation of the SIP/SS7 interface device 210. Any general-purpose operating system can be employed. Basic input/output system ("BIOS") 318 is also provided for controlling the low-level operation of the SIP/SS7 interface device 210.

As illustrated in FIG. 3, the SIP/SS7 interface device 210 can communicate with SIP network resources 216 via an SIP network interface unit 310 and SS7 network resources 218 via an SS7 network interface unit 332. The SIP network interface unit 310 is constructed for use with session initiation protocols. The SS7 network interface unit 332 is constructed for use with SS7 protocols. Each of the network interfaces 310, 332 can include, but is not limited to, a transceiver device or a network interface card (NIC).

Mass memory 315, as described above, illustrates a type of processor-readable storage media, which may include volatile, non-volatile, removable, non-removable media, or any combination thereof. Mass memory 315 can be implemented in any method or technology for storage of information, such as processor readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device.

RAM 316 also stores program code and data. One or more converged SIP and SS7 applications 380 are loaded into RAM 316 and run on the operating system 320. The converged SIP and SS7 application 380 can include various modules operative to facilitate interactions between SIP network resources 216 and SS7 network resources 218. According to embodiments of the present invention, the converged SIP and SS7 application 380 includes an event sequence determining module 250, an SIP message processing module 252, and SIP message generation module 254, a TCAP message processing module 256, and a TCAP message generation module 258. The application 250 is operative to determine a sequence of events to be performed by a system (e.g., the system 200 shown in FIG. 2) based on the type of message received thereat and/or information contained in the message received thereat. The application 252 is operative to process SIP messages received from an external device (e.g., the SIP application server 208 shown in FIG. 2). The application 254 is operative to generate SIP messages and communicate the same to an SIP network resource (e.g., the SIP application server 208 shown in FIG. 2). The application 256 is operative to process SS7 TCAP messages in an web service request formats received from an external device (e.g., the web service TCAP system 212 shown in FIG. 2). The application 258 is operative to generate SS7 TCAP messages in web service request formats and communicate the same to an SS7 network resource (e.g., the web service system 212 shown in FIG. 2).

As also shown in FIG. 3, the SIP/SS7 interface device 210 can further include an input/output interface 328 for communicating with external devices, such as a mouse (not shown), a keyboard, a scanner (not shown), or other input device. Likewise, SIP/SS7 interface device 210 can further include additional mass storage facilities such as CD-ROM/DVD-ROM drive 326 and hard disk drive 330. Hard disk drive 330 is utilized by SIP/SS7 interface device 210 to store, among other things, application programs, databases, an event sequence determining module 350, an SIP message processing module 352, an SIP message generation module 354, a TCAP message processing module 356, a TCAP message generation module, and the like.

Referring now to FIG. 4, there is provided a schematic illustration of message flows in an embodiment of a process for connecting the network element with a TCAP interface to the SS7 application server. The message flows are between the SIP system 206, the SIP application server 208, the SIP/SS7 interface device 210, the web service system 212, and the SS7 network element 214. As described above in relation to FIG. 2, the SIP system 206 can be a gateway serving an originating terminal of a telecommunication network 202, 204. Upon receipt of a message from the originating terminal, the SIP system 206 communicates an SIP INVITE message 402 to the SIP application server 208 for initiating a call. The SIP INVITE message 402 includes basic call information, such as the address of the originating terminal, the address of the called terminal and/or proxy information. The SIP INVITE message 402 also includes information indicating that it is necessary to invoke an application 380 installed on the SIP/SS7 interface device 210. Accordingly, the SIP application server 208 generates an INVOKE APPLICATION message 404 in response to the receipt of the SIP INVITE message 402. The INVOKE APPLICATION message 404 includes information for invoking at least one module 350, 352, . . . , 358 installed on the SIP/SS7 interface device 210. The generated message is then communicated from the SIP application server 208 to the SIP/SS7 interface device 210. Also in response to the SIP INVITE message 402, the SIP application server 208 generates an SIP TRYING message 406 to acknowledge the call initiation request. The SIP TRYING message 406 is communicated from the SIP application server 208 to the SIP system 206.

In response to the INVOKE APPLICATION message 404, the SIP/SS7 interface device 210 dynamically generates a TCAP BEGIN WEB SERVICE REQUEST message 408 requesting data from a web service (e.g., requesting prompt information from a web service). The TCAP BEGIN WEB SERVICE REQUEST message 408 can be generated in an Extensible Markup Language (XML) format of a web service request. According to embodiments of the present invention, a machine-readable description of the operations offered by a web service is written in WSDL. The WSDL for the web service request can contain all of the parameters for a TCAP message. The complexity of web service requests is not limited to a subset of TCAP parameters. Also, the use of web service requests provides a highly efficient and flexible solution for integrating a legacy SS7 network element into an SIP network. Subsequent to generating the TCAP BEGIN WEB SERVICE REQUEST message 408, the SIP/SS7 interface device 210 communicates the generated message 408 to the web service system 212. At the web service system 212, a TCAP BEGIN WEB SERVICE RESPONSE message 410 is generated in response to receiving the TCAP BEGIN WEB SERVICE REQUEST message 408. The TCAP BEGIN WEB SERVICE RESPONSE message 410 is communicated from the web service system 212 to the SIP/SS7 interface device 210 for acknowledging receipt of the web service request (e.g., for acknowledging receipt of the request for prompt information).

Also at the web service system 212, the TCAP BEGIN WEB SERVICE REQUEST message 408 is converted into a TCAP message, such as a TCAP BEGIN message 414 requesting information (e.g., prompt information). The TCAP BEGIN message 414 is communicated from the web service system 212 to the SS7 network element 214. At the SS7 network element 214, the TCAP BEGIN message 414 is processed. Once the SS7 network element 214 has finished processing the TCAP BEGIN message 414, the SS7 network element 214 generates a TCAP RESPONSE message 416. The TCAP RESPONSE message 416 can include information for playing a prompt. The TCAP RESPONSE message 416 is then communicated from the SS7 network element 214 to the web service system 212. Although the TCAP RESPONSE message 416 shares the same TCAP dialog as the TCAP BEGIN message 414 (i.e., the messages 414 and 416 are related), the web service system 212 starts a new web service request. More particularly, the web service system 212 generates a TCAP CONTINUE WEB SERVICE REQUEST message 418 for starting or continuing a new web service request (e.g., for playing the prompt). The TCAP CONTINUE WEB SERVICE REQUEST message 418 is communicated from the web service system 212 to the SIP/SS7 interface device 210.

At the SIP/SS7 interface device 210, an INVOKE APPLICATION message 419 is generated. The generated message 419 is communication from the SIP/SS7 interface device 210 to the SIP application server 208. In turn, the SIP application server 208 generates an SIP OK message 420 and communicates the same to the SIP system 206. The SIP OK message 420 includes information indicating that the call should be answered.

Also at the SIP/SS7 interface device 210, the TCAP CONTINUE WEB SERVICE REQUEST message 418 is correlated to the application session that sent the TCAP BEGIN WEB SERVICE REQUEST message 408 to make sure that the right call is being serviced properly. The message correlation occurs at the application level of the SIP/SS7 interface device 210. The message correlation generally involves obtaining application session identifiers from Uniform Resource Identifiers (URIs) of the TCAP CONTINUE WEB SERVICE REQUEST message 418 and the TCAP BEGIN WEB SERVICE REQUEST message 408. The application session identifiers are correlated to each other to ensure that the TCAP CONTINUE WEB SERVICE REQUEST message 418 is received by the session that sent the original request message (i.e., the message 408). Each application session identifier is associated with a particular SIP call. The SIP/SS7 interface device 210 also generates a TCAP WEB SERVICE RESPONSE message 422 including information acknowledging receipt of the web service request (e.g., information acknowledging receipt of the web service request to play the prompt). The TCAP WEB SERVICE RESPONSE message 422 is communicated from the SIP/SS7 interface device 210 to the web service system 212.

The following Example is provided in order to further illustrate the purpose of the message correlation performed at the SIP/SS7 interface device 210. The scope of the invention, however, is not to be considered limited in any way thereby.

EXAMPLE 1

Lets assume that two (2) separate call requests have been received at the SIP application server 208. A first call request includes information for initiating a first call. A second call request includes information for initiating a second call. As a result, the SIP application server 208 creates two (2) different application sessions, namely a first session to process the first call and a second session to process the second call. The SIP application server 208 sends a first and second INVOKE APPLICATION message to the SIP/TCAP computing device. In turn, the SIP/TCAP computing device sends a first and second TCAP BEGIN WEB SERVICE REQUEST message to the web service system 212. The first TCAP BEGIN WEB SERVICE REQUEST message includes information associating the event with the first call and/or first session. Likewise, the second TCAP BEGIN WEB SERVICE REQUEST message includes information associating the event with the second call and/or second session. In response to receiving the TCAP BEGIN WEB SERVICE REQUEST messages, the web service system 212 sends a first TCAP BEGIN message the SS7 network element 214, where the first TCAP BEGIN message includes information identifying the first session. Similarly, the SIP application server 208 sends a second TCAP BEGIN message to the SS7 network element 214, where the second TCAP BEGIN message includes information identifying the second session. Thereafter, the SS7 network element 214 sends two (2) TCAP RESPONSE messages to the web service system 212. The web service system 212 generates two (2) TCAP CONTINUE WEB SERVICE REQUEST messages and communicates them to the SIP/SS7 interface device 210. The SIP/SS7 interface device 210 processes the received TCAP CONTINUE WEB SERVICE REQUEST messages to correlate session identifiers obtained from Uniform Resource Identifiers (URIs) thereof to session identifiers contained in the TCAP BEGIN WEB SERVICE REQUEST messages. This correlation ensures that the messages are forwarded to the correct session.

Figure 5A:
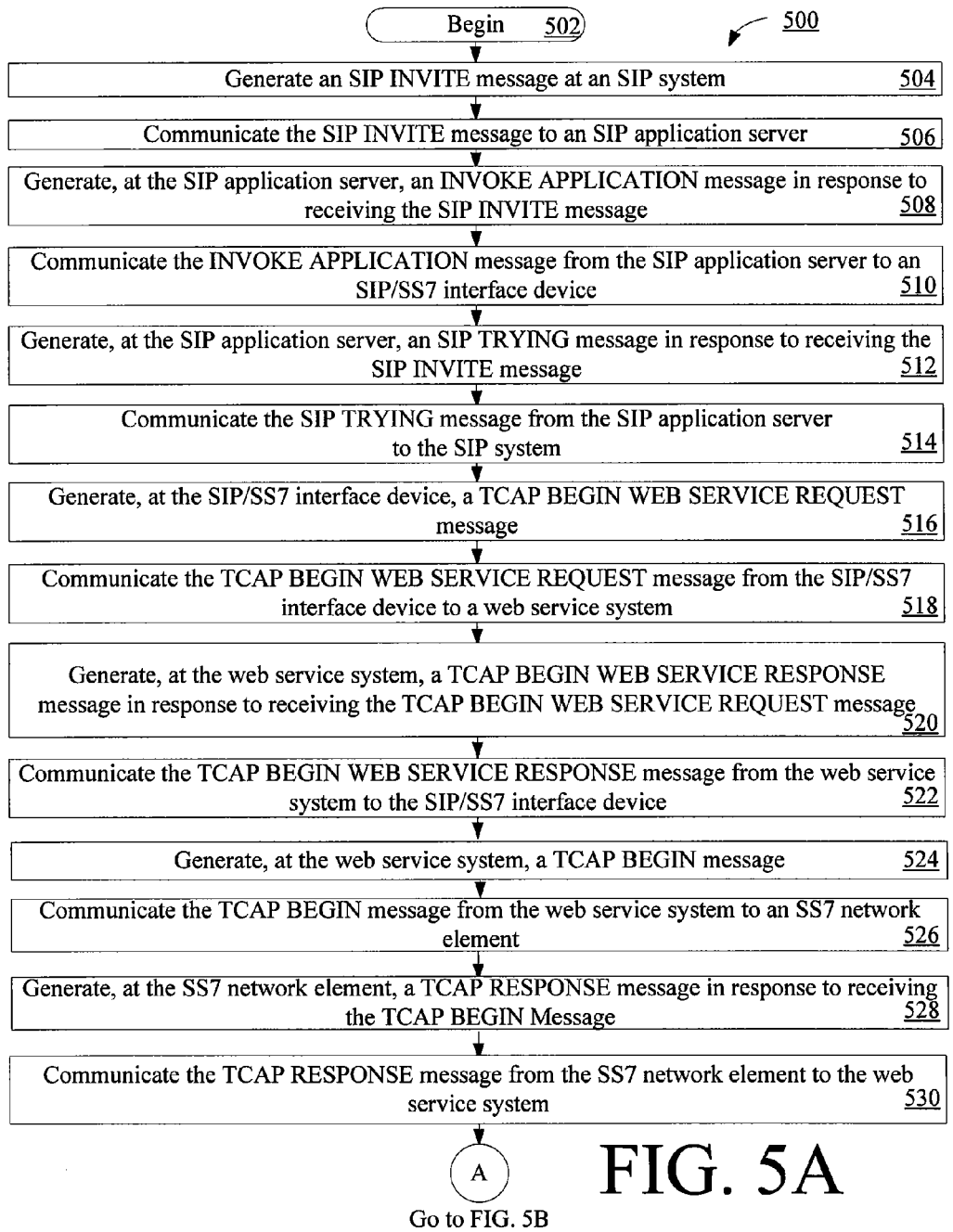
FIGS. 5A-5B collectively provide a flow diagram of a method for connecting an SS7 network resource with a TCAP interface to an SIP network resource that is useful for understanding the present invention.
Figure 5B:
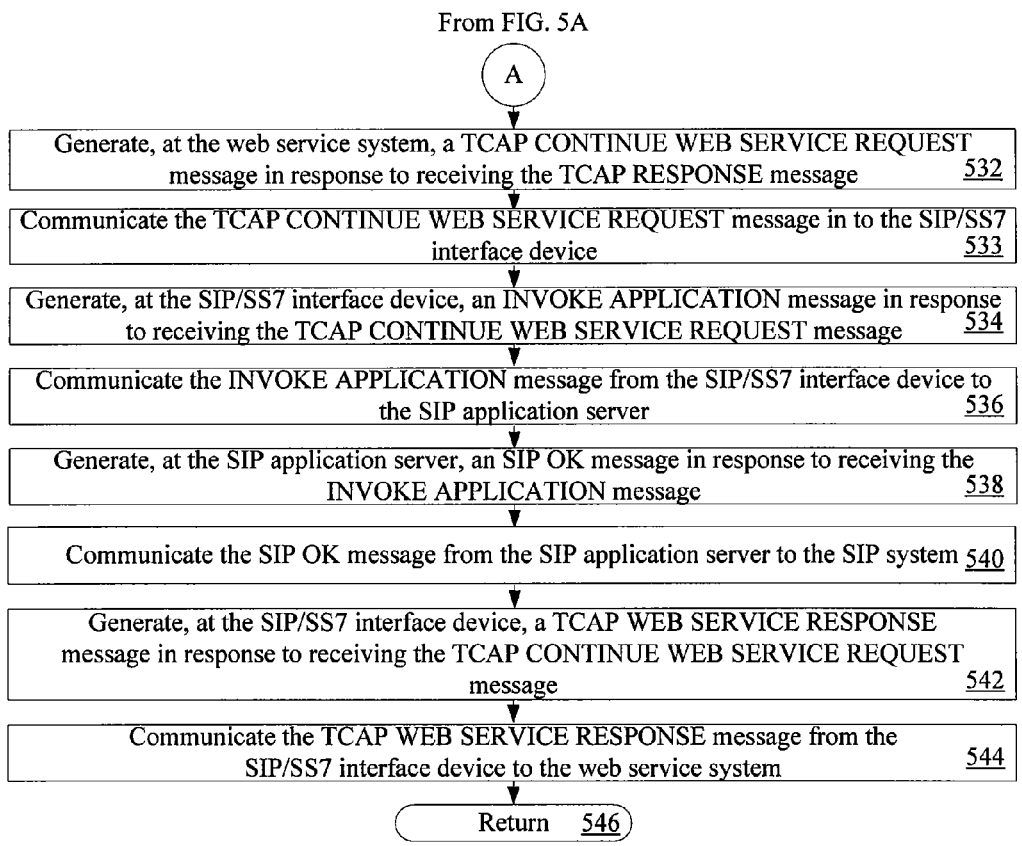

The following FIGS. 5A-5B and accompanying text illustrate a method 500 according to an embodiment of the present invention for connecting an SS7 network element with a TCAP interface to an SIP application server that is useful for understanding the present invention. It should be appreciated, however, that the method 500 disclosed herein is provided for purposes of illustration only and that embodiments of the present invention are not limited solely to the method shown.

Referring now to FIGS. 5A-5B, there is provided a flow diagram of an exemplary method 500 for connecting an SS7 network element with a TCAP interface to an SIP application server that is useful for understanding the present invention. As shown in FIG. 5A, the method 500 begins with step 502 and continues to step 504. In step 504, an SIP INVITE message (e.g., the SIP INVITE message 402 of FIG. 4) is generated at an SIP system (e.g., the SIP system 206 of FIG. 2). The SIP INVITE message includes information for initiating a call between an originating (or calling) terminal and a called terminal. Thereafter, step 506 is performed where the SIP INVITE message is communicated from the SIP system to an SIP application server (e.g., the SIP application server 208 of FIG. 2). In response to the SIP INVITE message, step 508 is performed where the SIP application server generates an INVOKE APPLICATION message (e.g., the INVOKE APPLICATION message 404 of FIG. 4) for invoking an application (e.g., the application 380 shown in FIG. 3) installed on a SIP/SS7 interface device (e.g., the SIP/SS7 interface device 210 of FIGS. 2-3).

In a next step 510, the INVOKE APPLICATION message is communicated from the SIP application server to the SIP/SS7 interface device. Upon receipt of the INVOKE APPLICATION message, one or more modules installed on the SIP/SS7 interface device are invoked. For example, an SIP message processing module (e.g., module 352 of FIG. 3) is invoked for processing the received message. Also, an event sequence determining module (e.g., the module 350 of FIG. 3) is invoked for determining a sequence of events that are to be performed by a system (e.g., the system 200). This determination can be made using information contained in the received INVOKE APPLICATION message.

In a next step 512, an SIP TRYING message (e.g., the SIP TRYING message 406 of FIG. 4) is generated at the SIP application server. The SIP TRYING message includes information for acknowledging receipt of the call initiation request. In a next step 514, the SIP TRYING message is communicated from the SIP application server to the SIP system to acknowledge receipt of the call initiation request.

In step 516, a TCAP BEGIN WEB SERVICE REQUEST message (e.g., the TCAP BEGIN WEB SERVICE REQUEST message 408 of FIG. 4) is generated at the SIP/SS7 interface device. The TCAP BEGIN WEB SERVICE REQUEST includes a request for data from a web service. The TCAP BEGIN WEB SERVICE REQUEST message can be generated in an XML format of a web service request. The WSDL for the web service request can contain some or all of the parameters for a TCAP message. The message generation of step 516 can be facilitated by a TCAP message generation module (e.g., the TCAP message generation module 456 of FIG. 4) installed on the SIP/SS7 interface device. The TCAP BEGIN WEB SERVICE REQUEST message is then communicated in step 518 to the web service system.

Steps 520 and 522 are performed in response to the receipt of the TCAP BEGIN WEB SERVICE REQUEST message at the web service system. Step 520 involves generating a TCAP BEGIN WEB SERVICE RESPONSE message (e.g., message 410 of FIG. 4). Thereafter, the message is communicated from the web service system to the SIP/SS7 interface device in step 522 for acknowledging receipt of the web service request. In steps 524 and 526, the web service system generates a TCAP BEGIN message (e.g., the TCAP BEGIN message 414 of FIG. 4) and communicates this message to the SS7 network element. Upon completing step 526, the method 500 continues with step 528. Step 528 involves generating a TCAP RESPONSE message (e.g., the TCAP RESPONSE message 416 of FIG. 4) at the SS7 network element. The TCAP RESPONSE message is then communicated to the web service system in step 530. Thereafter, the method 500 continues with a step 532 of FIG. 5B.

Referring now to FIG. 5B, step 532 involves generating a TCAP CONTINUE WEB SERVICE REQUEST message (e.g., message 418 of FIG. 4) at the web service system. The TCAP CONTINUE WEB SERVICE REQUEST message includes a session identifier in a URI thereof. Step 533 involves communicating the TCAP CONTINUE WEB SERVICE REQUEST message from the web service system to the SIP/SS7 interface device. At the SIP/SS7 interface device, the session identifier contained in the URI of the TCAP CONTINUE WEB SERVICE REQUEST message is correlated with a session identifier contained in a URI of the TCAP BEGIN WEB SERVICE REQUEST message. This message correlation can be facilitated using a TCAP message processing module installed on the SIP/SS7 interface device.

Thereafter, step 534 is performed where the SIP/SS7 interface device generates an INVOKE APPLICATION message (e.g., the message 419 of FIG. 4) for invoking an application installed on the SIP application server. The INVOKE APPLICATION message is then communicated from the SIP/SS7 interface device to the SIP application server in step 536. In response to the INVOKE APPLICATION message, steps 538 and 540 are performed. Step 538 involves generating an SIP OK message (e.g., message 420 of FIG. 4). The SIP OK message is communicated from the SIP application server to the SIP system in step 540.

In step 542, the SIP/SS7 interface device generates a TCAP WEB SERVICE RESPONSE message (e.g., message 422 of FIG. 4). This message generation can be facilitated by using a TCAP message generation module installed on the SIP/SS7 interface device. In a next step 544, the TCAP WEB SERVICE RESPONSE message is communicated from the SIP/SS7 interface device to the web service system. Upon completing step 544, step 546 is performed where the method 500 returns to step 504 or other processing is resumed.

Notably, the methods 100, 500 allow an entire TCAP message to be passed to and from a device having the application 380 installed therein. As noted above, the device can include the SIP application sever 108, the SIP/TCAP computing device or the web service system 112. The methods 100, 500 also allow any part of a TCAP message to be programmatically processed in the device having the application 380 installed therein. The methods 100, 500 further allow the application 380 running on a device (e.g., the SIP application server 108, the SIP/TCAP computing device or the web service system 112) to process both SIP and TCAP messages upon receipt of the same. The application 380 running on the device (e.g., the SIP application server 108, the SIP/TCAP computing device or the web service system 112) is not blocked from processing other messages while it is waiting for an SIP or TCAP message to be returned.

In light of the forgoing description of the invention, it should be recognized that the present invention can be realized in hardware, software, or a combination of hardware and software. A method for connecting an SS7 network element with a TCAP interface to an SIP application server according to the present invention can be realized in a centralized fashion in one processing system, or in a distributed fashion where different elements are spread across several interconnected processing systems. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

Applicants present certain theoretical aspects above that are believed to be accurate that appear to explain observations made regarding embodiments of the invention. However, embodiments of the invention may be practiced without the theoretical aspects presented. Moreover, the theoretical aspects are presented with the understanding that Applicants do not seek to be bound by the theory presented.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

The word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is if, X employs A; X employs B; or X employs both A and B, then "X employs A or B" is satisfied under any of the foregoing instances.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

We claim:

1. A computer implemented method for connecting network resources of a first network to network resources of a second network that is different from the first network, comprising the acts of:

receiving a first message from a first network resource of the first network, said first message formatted in accordance with a first application layer protocol of a first network telephony protocol suite;

in response to the reception of said first message, dynamically generating a second message having a web service request format and including a request for data from a web service, wherein a machine-readable description of operations offered by said web service comprises all parameters for a message formatted in accordance with a second application layer protocol of a second network telephony protocol suite different than said first application layer protocol of said first network telephony protocol suite, said second network telephony protocol suite being different than said first network telephony protocol suite;

communicating the second message to a second network resource of the second network for conversion into a third message having a second network telephony protocol format; and communicating the third message from the second network resource to a third network resource of the second network using the second network telephony protocol suite.

2. The computer implemented method according to claim 1, wherein the first network includes an SIP based network.

3. The computer implemented method according to claim 2, wherein the SIP based network is an Internet Protocol Multimedia Subsystem based network.

4. The computer implemented method according to claim 1, wherein the second network includes an SS7 based network.

5. The computer implemented method according to claim 1, wherein the first application layer protocol is an session initiation protocol.

6. The computer implemented method according to claim 1, wherein the second application layer protocol is a Signaling System Number Seven application layer protocol.

7. The computer implemented method according to claim 1, wherein the network resources of the first network include at least one of an SIP application server, an SIP gateway and an SIP platform.

8. The computer implemented method according to claim 1, wherein the network resources of the second network include at least one of a web service TCAP system, a switch, a database server and a routing node.

9. The computer implemented method according to claim 1, wherein the second message is dynamically generated in an Extensible Markup Language format.

10. The computer implemented method according to claim 9, wherein a Web Services Description Language for the web service request contains at least one parameter for the second message having an Signaling System Number Seven protocol format.

11. A network interface, comprising:
at least one processing device configured to
receive a first message from a first network resource of a first network, said first message formatted in accordance with a first application layer protocol of a first network telephony protocol suite,
in response to the reception of the first message, dynamically generate a second message having a web service request format and including a request for data from a web service, wherein a machine-readable description of operations offered by said web service comprises all parameters for a message formatted in accordance with a second application layer protocol of a second network telephony protocol suite different than said first application layer protocol of said first network telephony protocol suite, said second network telephony protocol suite being different than said first network telephony protocol suite,
communicate the second message to a second network resource of a second network for conversion into a third message having a second network telephony protocol format, and
communicating the third message from the second network resource to a third network resource of the second network using the second network telephony protocol suite.

12. The network interface according to claim 11, wherein the first network is an SIP based network.

13. The network interface according to claim 12, wherein the SIP based network is an Internet Protocol Multimedia Subsystem based network.

14. The network interface according to claim 11, wherein the second network is an SS7 based network.

15. The network interface according to claim 11, wherein the first application layer protocol is a session initiation protocol.

16. The network interface according to claim 11, wherein the second application layer protocol is a Signaling System Number Seven application layer protocol.

17. The network interface according to claim 11, wherein each of the first and second network resources includes at least one of an SIP application server, an SIP gateway and an SIP platform.

18. The network interface according to claim 11, wherein the second message is dynamically generated in an Extensible Markup Language format.

19. The network interface according to claim 18, wherein a Web Services Description Language for the web service request contains at least one parameter for the second message having an Signaling System Number Seven protocol format.

20. A network interface, comprising:
at least one processing device configured to
receive a first message from an application server of a first network, said first message formatted in accordance with a first application layer protocol of a first network telephony protocol suite,
in response to the reception of the first message, dynamically generate a second message having a web service request format and including a request for data from a web service, wherein a machine-readable description of operations offered by said web service comprises all parameters for a message formatted in accordance with a second application layer protocol of a second network telephony protocol suite different than said first application layer protocol of said first network telephony protocol suite, said second network telephony protocol suite being different than said first network telephony protocol suite,
communicate the second message to a second network resource of a second network for conversion into a third message formatted in accordance with said second application layer protocol, said second application layer protocol being a Signaling System Number Seven application layer protocol; and
communicate the third message from the second network resource to a third network resource of the second network using the second network telephony protocol suite;
wherein the second message is dynamically generated in an Extensible Markup Language format.

* * * * *